United States Patent
Gavraskar et al.

(10) Patent No.: US 12,041,052 B2
(45) Date of Patent: *Jul. 16, 2024

(54) CONTINUING A MEDIA ACCESS CONTROL SECURITY (MACSEC) KEY AGREEMENT (MKA) SESSION UPON A NETWORK DEVICE BECOMING TEMPORARILY UNAVAILABLE

(71) Applicant: Juniper Networks, Inc., Sunnyvale, CA (US)

(72) Inventors: Nikhil Gavraskar, Aurangabad (IN); Veena Choudhary, Bangalore (IN); Sachin Mutalik Desai, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,408

(22) Filed: Jun. 1, 2023

(65) Prior Publication Data
US 2023/0308445 A1   Sep. 28, 2023

Related U.S. Application Data

(63) Continuation of application No. 16/824,028, filed on Mar. 19, 2020, now Pat. No. 11,711,367.

(51) Int. Cl.
  *H04L 9/40*   (2022.01)
(52) U.S. Cl.
  CPC ............ *H04L 63/10* (2013.01); *H04L 63/065* (2013.01)
(58) Field of Classification Search
  CPC ..... H04L 63/065; H04L 63/10; H04L 63/162; H04L 67/144; H04L 67/142; H04L 67/145

USPC ............................................................ 726/4
See application file for complete search history.

(56) References Cited

U.S. PATENT DOCUMENTS

| | | |
|---|---|---|
| 5,694,537 A | 12/1997 | Montenegro et al. |
| 8,719,567 B2 | 5/2014 | Weis et al. |
| 10,469,461 B1 | 11/2019 | Singh |
| 11,265,301 B1 | 3/2022 | Gupta et al. |

(Continued)

OTHER PUBLICATIONS

Extended European Search Report for Application No. EP20174112.1, mailed on Sep. 15, 2020, 10 pages.

(Continued)

*Primary Examiner* — Samson B Lemma
(74) *Attorney, Agent, or Firm* — Harrity & Harrity, LLP

(57) ABSTRACT

A network device may communicate with another network device via a media access control security (MACsec) key agreement (MKA) communication link, wherein an MKA session has been established between the network device and the other network device. The network device may determine that the other network device is unavailable. The network device may cause, based on determining that the other network device is unavailable, an MKA state of the network device to be placed in a paused state. The network device may receive, after causing the MKA state of the network device to be placed in the paused state, a packet from the other network device via the MKA communication link. The network device may determine, based on the packet, that the MKA session has not ended. The network device may continue, based on the MKA session having not ended, the MKA session by reactivating the MKA state.

20 Claims, 12 Drawing Sheets

(56) References Cited

U.S. PATENT DOCUMENTS

| | | | |
|---|---|---|---|
| 2011/0296044 A1* | 12/2011 | Weis | H04L 67/142 |
| | | | 709/230 |
| 2014/0258532 A1* | 9/2014 | Weis | H04L 43/0811 |
| | | | 709/225 |
| 2016/0036813 A1 | 2/2016 | Wakumoto et al. | |
| 2017/0142064 A1* | 5/2017 | Weis | H04L 63/061 |
| 2018/0302269 A1* | 10/2018 | Sankaran | H04L 63/162 |
| 2019/0116183 A1* | 4/2019 | Hussain | H04L 63/08 |
| 2019/0191307 A1* | 6/2019 | Sheng | H04L 63/065 |
| 2019/0281031 A1* | 9/2019 | Pothula | H04L 9/0838 |
| 2019/0386824 A1* | 12/2019 | Havaralu Rama Chandra Adiga | H04L 63/061 |
| 2020/0067891 A1* | 2/2020 | Singh | H04L 63/0272 |
| 2020/0120134 A1* | 4/2020 | Hill | H04L 63/0485 |
| 2020/0220843 A1* | 7/2020 | Hill | H04L 63/162 |
| 2020/0259834 A1 | 8/2020 | Hussain et al. | |
| 2020/0358764 A1 | 11/2020 | Hojilla Uy et al. | |
| 2021/0105348 A1* | 4/2021 | Pothula | H04W 12/0431 |
| 2021/0176255 A1* | 6/2021 | Hill | H04L 9/3234 |
| 2021/0297416 A1 | 9/2021 | Gavraskar et al. | |

OTHER PUBLICATIONS

Weis B., "MKA Suspension," IEEE Draft XBX-WEIS-MKA-SUSPENSION-0713, Jul. 14, 2012, vol. 802 (1), pp. 1-9, XP068008497, [Retrieved on Jul. 14, 2012].

* cited by examiner

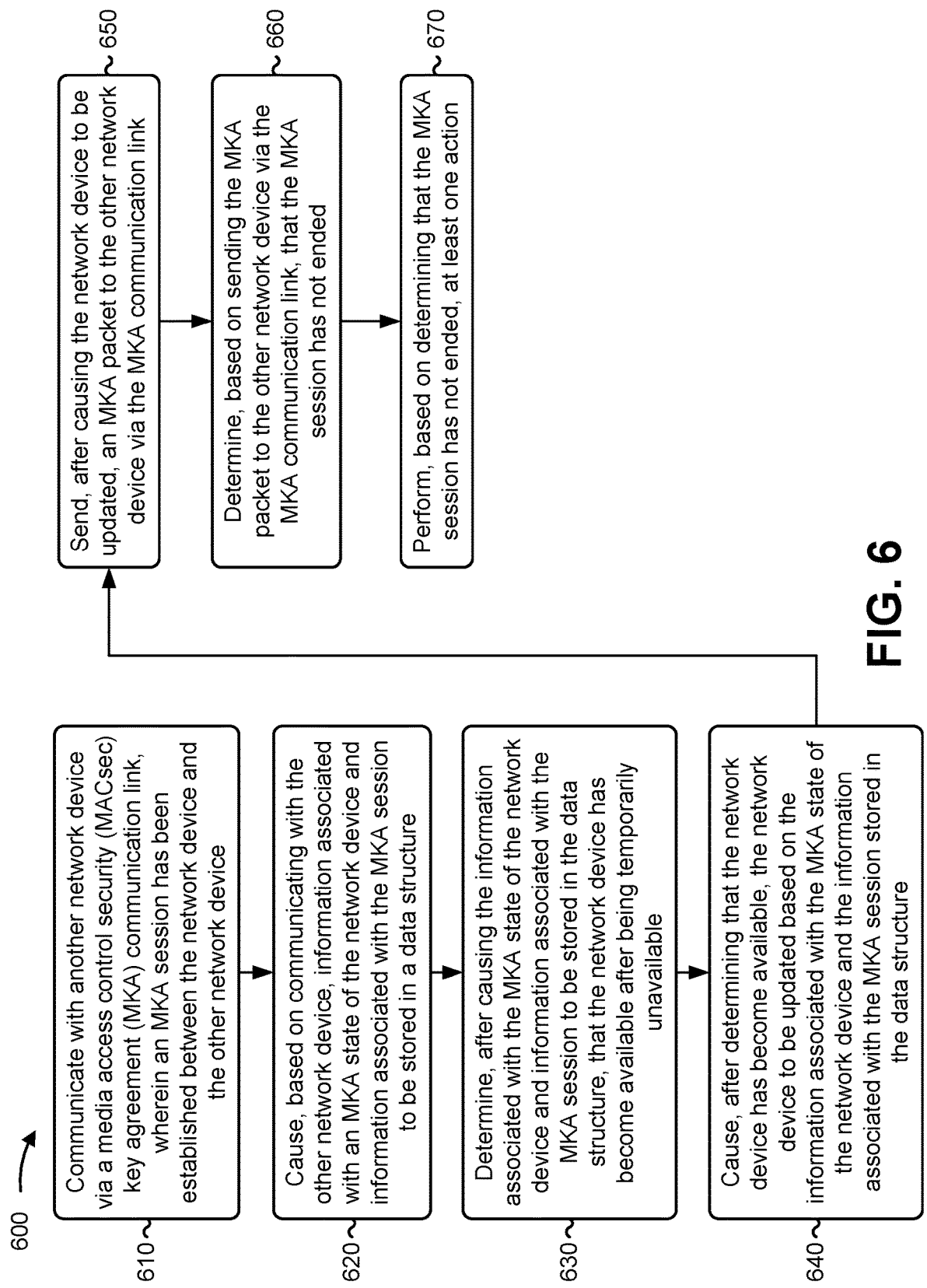

CONTINUING A MEDIA ACCESS CONTROL SECURITY (MACSEC) KEY AGREEMENT (MKA) SESSION UPON A NETWORK DEVICE BECOMING TEMPORARILY UNAVAILABLE

RELATED APPLICATION

This application is a continuation of U.S. patent application Ser. No. 16/824,028, filed Mar. 19, 2020, which is incorporated herein by reference in its entirety.

BACKGROUND

Media access control security (MACsec) is a security standard, defined by the Institute of Electrical and Electronics Engineers (IEEE) 802.1AE, that defines connectionless data confidentiality and integrity for media access independent protocols. The MACsec standard specifies a set of protocols to meet security requirements for protecting data traversing Ethernet local area networks (LANs). MACsec allows unauthorized LAN connections to be identified and excluded from communication within a network, and defines a security infrastructure to provide data confidentiality, data integrity, and data origin authentication.

SUMMARY

According to some implementations, a method may include communicating, by a network device, with another network device via a media access control security (MACsec) key agreement (MKA) communication link, wherein an MKA session has been established between the network device and the other network device; determining, by the network device, that the other network device is unavailable; causing, by the network device and based on determining that the other network device is unavailable, an MKA state of the network device to be placed in a paused state; receiving, by the network device and after causing the MKA state of the network device to be placed in the paused state, a packet from the other network device via the MKA communication link; determining, by the network device and based on the packet, that the MKA session has not ended; and continuing, by the network device and based on the MKA session having not ended, the MKA session by reactivating the MKA state.

According to some implementations, a network device may include one or more memories; and one or more processors to: communicate with another network device via a media access control security (MACsec) key agreement (MKA) communication link, wherein an MKA session has been established between the network device and the other network device; cause, based on communicating with the other network device, information associated with an MKA state of the network device and information associated with the MKA session to be stored in a data structure, determine that the network device is to become unavailable at a particular time; send, to the other network device and based on determining that the network device is to become unavailable at the particular time, an MKA packet indicating that the network device is to become unavailable; determine, after the particular time, that the network device has become available; and cause, after determining that the network device has become available, the network device to be updated based on the information associated with the MKA state of the network device and the information associated with the MKA session stored in the data structure.

According to some implementations, a non-transitory computer-readable medium may store one or more instructions. The one or more instructions, when executed by one or more processors of a network device, may cause the one or more processors to: communicate with another network device via a media access control security (MACsec) key agreement (MKA) communication link, wherein an MKA session has been established between the network device and the other network device; cause, based on communicating with the other network device, information associated with an MKA state of the network device and information associated with the MKA session to be stored in a data structure, determine, after causing the information associated with the MKA state of the network device and information associated with the MKA session to be stored in the data structure, that the network device has become available after being temporarily unavailable; cause, after determining that the network device has become available, the network device to be updated based on the information associated with the MKA state of the network device and the information associated with the MKA session stored in the data structure; send, after causing the network device to be updated, an MKA packet to the other network device via the MKA communication link; determine, based on sending the MKA packet to the other network device via the MKA communication link, that the MKA session has not ended; and perform, by the network device and based on determining that the MKA session has not ended, at least one action.

BRIEF DESCRIPTION OF THE DRAWINGS

FIGS. 4-6 are flowcharts of one or more example processes for continuing a media access control security (MACsec) key agreement (MKA) session upon a network device becoming temporarily unavailable.

DETAILED DESCRIPTION

Figure 1A:
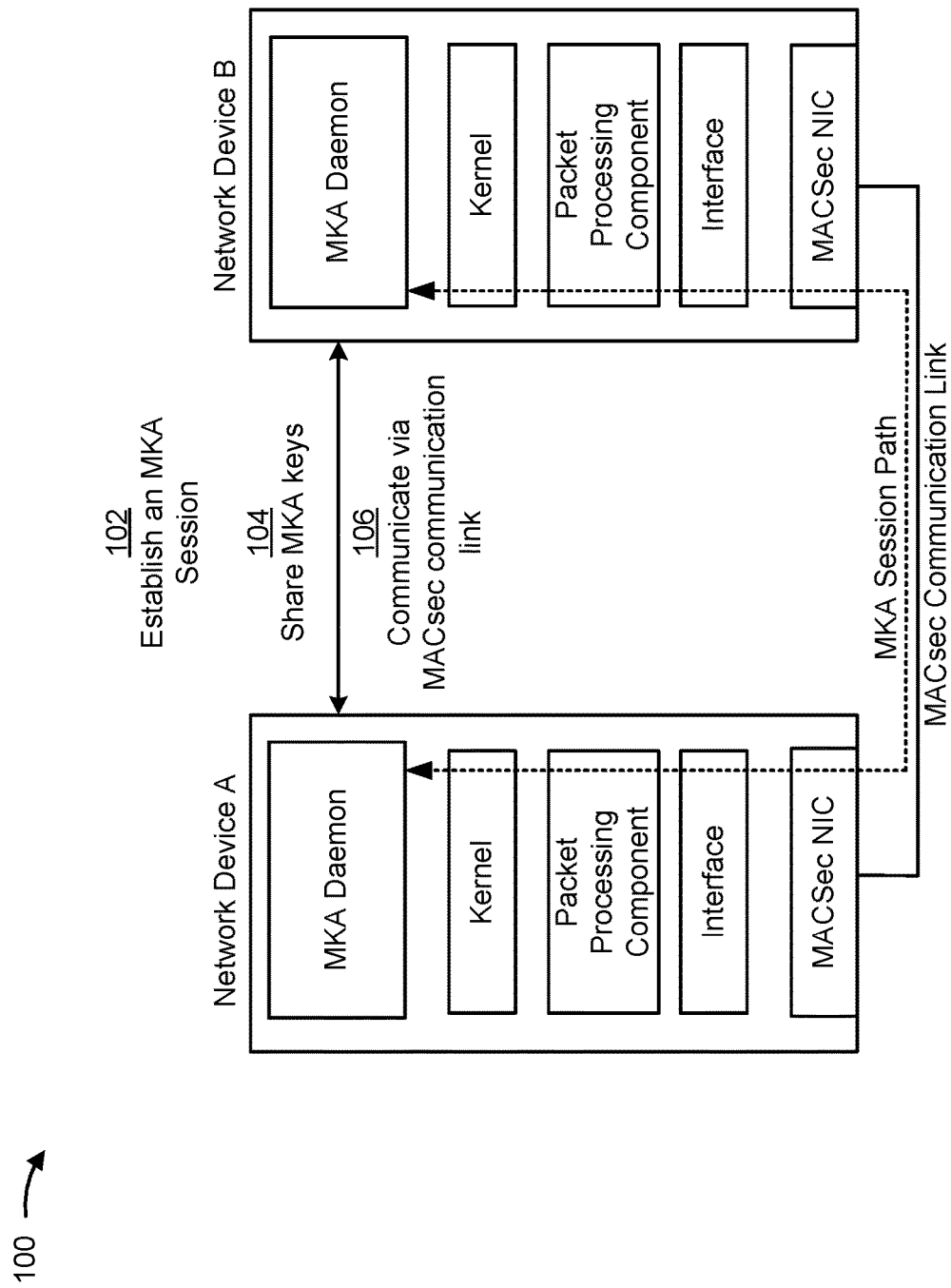
FIGS. 1A-1F are diagrams of one or more example implementations described herein.

The following detailed description of example implementations refers to the accompanying drawings. The same reference numbers in different drawings may identify the same or similar elements.

In some instances, a network device may establish a media access control security (MACsec) key agreement (MKA) session (e.g., a secure session) with another network device. When one of the network devices reboots or goes offline, the MKA session is destroyed. In such cases, when the network device that went offline comes back online a new MKA session must be established between the network devices. However, continually destroying and establishing new MKA sessions between a network device and another network device may waste computing resources (e.g., processing resources, memory resources, communication resources, and/or the like) and/or network resources associated with destroying and establishing the MKA sessions. Additionally, destroying an MKA session when one of the network devices goes offline and establishing a new MKA session when the network device comes back online may waste computing resources and/or network resources associated with a delay in a communication of traffic between the network devices waiting for the MKA session to be reestablished. Moreover, destroying an MKA session when one of the network devices goes offline and establishing a new MKA session when the network device comes back online may cause a delay in overall network service resumption that may waste computing resources and/or network resources associated with the delay.

According to some implementations described herein, a network device may continue an MKA session upon another network device becoming temporarily unavailable (e.g., rebooting, going offline, failing, and/or the like). In some implementations, the network device may communicate with another network device via an MKA communication link, establishing an MKA session. The network device may determine that the other network device is unavailable (e.g., rebooting, going offline, failing, and/or the like). The network device may cause an MKA state of the network device to be placed in a paused state. The network device may receive a packet from the other network device via the MKA communication link. The network device may determine, based on the packet, that the MKA session has not ended. The network device may continue, based on the MKA session having not ended, the MKA session with the other network device by reactivating the MKA state.

In this way, the network device may conserve computing resources and/or network resources that would have otherwise been used to destroy the MKA session when the other network device became unavailable and reestablish the MKA session when the other network device became available again. Furthermore, the network device may quickly resume MKA sessions and may conserve computing resources and/or network resources that would have otherwise been used waiting to communicate traffic while the MKA session is reestablished after the other network device becomes available again.

FIGS. 1A-1F are diagrams of one or more example implementations 100 described herein. As shown in FIGS. 1A-1F, a network device A and a network device B may be in communication via a MACsec communication link (e.g., an MKA communication link). As shown in FIGS. 1A-1F, network device A and network device B may include an MKA stack. The MKA stacks of network device A and/or network device B may include an MKA daemon, a kernel, a packet processing component, an interface, and/or a MACsec network interface controller (NIC).

In the MKA stack of example implementation(s) 100 of FIGS. 1A-1F, the MKA daemon may include a process or program operating in the background of the network device (e.g., network device A and/or network device B) to exchange MKA communications (e.g., packets) with MKA enabled devices. The kernel may include a program that operates to translate packet data between the packet processing component and the MKA daemon. The packet processing component may perform packet switching and/or routing of MKA packet data, such as extensive authentication protocol over local area network (EAPoL) packets. The interface may serve as a software interface between the MACsec NIC and the network device/packet processing component. The MACsec NIC may serve as the hardware interface between the network device (e.g., network device A and/or network device B) and a network (e.g., a network of the MACsec communication link). In some implementations, the MACsec NIC may be a software interface between the network device and the network.

In the example implementation(s) 100, data may be exchanged via an MKA session path. As shown in FIGS. 1A-1F, the MKA session path may be between MKA daemons of network device A and network device B. The MKA session path may travel through each element in the MKA stacks (e.g., the MACsec NIC, the interface, the packet processing component, and the kernel) of network device A and/or network device B.

As shown in FIG. 1A, and by reference number 102, an MKA session may be established between network device A and network device B, as described in more detail below. During the MKA session, MKA packet data (e.g., peer liveness messages) may be scheduled to be sent periodically (e.g., every 2 seconds or more) between the MKA daemon of network device A and the MKA daemon of network device B via the MKA session path (e.g., according to a standard).

As shown by reference number 104, network device A and network device B may share MKA keys (e.g., encryption keys, decryption keys, and/or the like). The MKA keys may be verified by network device A and/or network device B to establish the MKA session (e.g., if network device A and/or network device B is unable to verify an MKA key received from the other network device, then the MKA session may not be established). The MKA keys may be configured by a user associated with network device A and/or network device B. Alternatively, the MKA keys may be generated dynamically by network device A, network device B, a device (such as a server device, a cloud computing platform, and/or the like) associated with network device A and/or associated with network device B, and/or the like.

The MKA keys may include a connectivity association key (CAK), a secure association key (SAK), a master key, and/or the like. For example, to establish the MKA session, network device A and/or network device B may use preshared keys, such as a connectivity association name (CKN) and the CAK associated with the network device. The pre-shared keys may be configured by a user associated with network device A and/or network device B, and may be stored by network device A and/or by network device B. Network device A may share the pre-shared keys associated with network device A with network device B and network device B may share the pre-shared keys associated with network device B with network device A. If the pre-shared keys match (e.g., network device A verifies the pre-shared keys received from network device B and/or network device B verifies the pre-shared keys received from network device A), then the MKA session may be established.

In some implementations, after establishing the MKA session, network device A and network device B may negotiate (e.g., enable and/or configure) whether the MKA session will resume if one of the network devices becomes temporarily unavailable (e.g., temporarily goes offline, reboots, fails, and/or the like). As such, network device A and network device B may enable, disable, configure, and/or the like, the processes described herein associated with continuing an MKA session upon network device A and/or network device B becoming temporarily unavailable. In some implementations, this negotiation may only occur when network device A and network device B establish an MKA session for the first time. In this way, additional security may be provided as network device A and/or network device B may be required to agree to continue the MKA session upon network device A and/or network device B becoming available after being temporarily unavailable. As such, network device A and/or network device B may not store information related to the MKA session when network device A and/or network device B becomes unavailable (as described below in more detail) unless network device A and/or network device B agree to continue the MKA session when network device A and/or network device B become available again. This may improve security of network device A and/or network device B and conserve computing resources and/or network resources that would have otherwise been used to store information related to the MKA session.

As further shown in FIG. 1A, and by reference number 106, after establishing the MKA session, network device A and network device B may communicate via the MACsec communication link. For example, network device A may communicate traffic from network device A to network device B via the MACsec communication link (and vice versa).

In some implementations, the traffic communicated via the MACsec communication link may be secured using a key shared between network device A and network device B, such as the SAK. The SAK may be a randomly generated key. The SAK may be generated by network device A, network device B, and/or a device associated with network device A and/or associated with network device B. The SAK may be generated based on establishing the MKA session between network device A and network device B. Additionally, or alternatively, the SAK may be generated periodically such that a new SAK is shared between network device A and network device B each time a SAK is generated while the MKA session is active. The SAK may be shared from one network device to the other (e.g., from network device A to network device B or from network device B to network device A) and/or received by network device A and/or network device B from a device associated with network device A and/or associated with network device B. For example, the SAK may be shared after the MKA session is established. Network device A and/or network device B may use the SAK to secure all traffic sent via the MACsec communication link.

In some implementations, traffic communicated via the MACsec communication link between network device A and network device B may be associated with a message identifier. Traffic communicated via the MACsec communication link may be assigned a message identifier to ensure that the traffic is not received by a network device (e.g., network device A or network device B) out of sequence (e.g., out of order, associated with unrelated traffic, and/or the like). For example, the message identifier may be assigned such that the message identifier is associated with the most recent previously assigned message identifier (e.g., such that the message identifiers are assigned in an order).

Figure 1B:
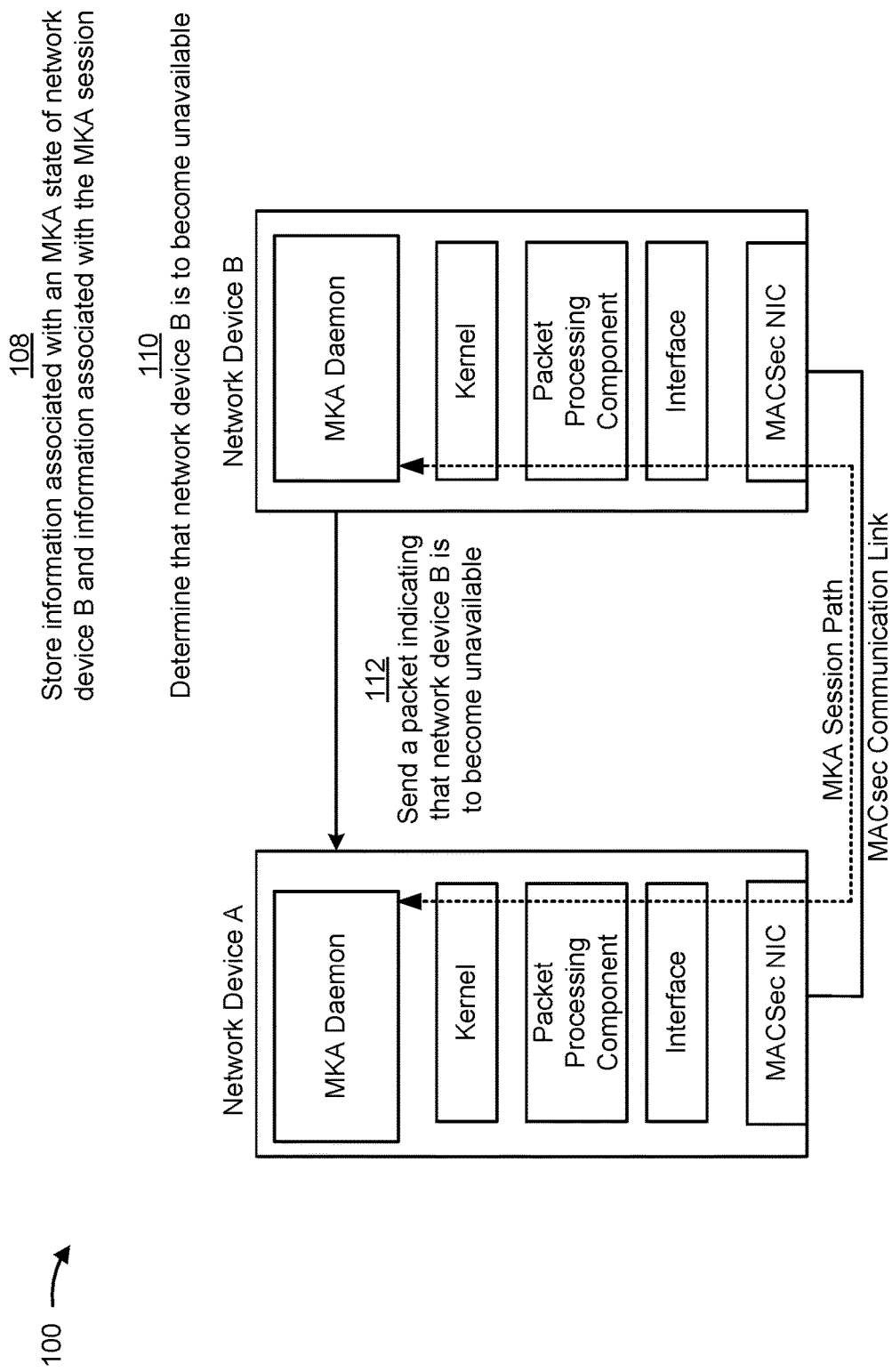

As shown in FIG. 1B, and by reference number 108, network device A may store information associated with an MKA state of network device A and/or information associated with the MKA session with network device B. Additionally, or alternatively, network device B may store information associated with an MKA state of network device B and/or information associated with the MKA session. Network device A and/or network device B may store the information associated with an MKA state and/or the information associated with the MKA session in a persistent storage (e.g., a storage that retains data after the network device becomes unavailable). The information associated with the MKA state of one network device may reference information associated other network device (e.g., the information associated with an MKA state of network device A may reference information associated with network device B and vice versa).

In this example, assume the information associated with the MKA state and the information associated with the MKA session are stored by network device B. Network device A may store information associated with the MKA state of network device A and the information associated with the MKA session in a similar manner. The information associated with the MKA state and the information associated with the MKA session, for network device B, may include one or more MKA keys, a control plane MKA state associated with network device B, one or more message identifiers associated with the MKA session, a MAC address associated with network device A and/or a MAC address associated with network device B, a port identifier associated with the MKA session, an identifier associated with network device A, and/or the like.

Network device B may store the information associated with the MKA state and the information associated with the MKA session periodically (e.g., once every 30 minutes, once every hour, once every day, and/or the like). Additionally, or alternatively, network device B may store the information associated with the MKA state and the information associated with the MKA session when network device B determines that network device B is going to become temporarily unavailable, such as by receiving an input directing network device B to go offline or reboot, by detecting a loss of power to network device B, by detecting a failure condition associated with network device B, and/or the like.

Network device B may store the information associated with the MKA state and the information associated with the MKA session in a data structure (e.g., a list, a table, a mapping, and/or the like) that network device B may access. The data structure may be stored in network device B, in a device associated with network device B, in a cloud computing environment associated with network device B, and/or the like. The data structure may be stored in a persistent storage. The information associated with the MKA state and the information associated with the MKA session may be stored in the data structure with an identifier that identifies the MKA session, such that network device B may access the information associated with the MKA state and the information associated with the MKA session by searching the data structure for the identifier that identifies the MKA session. For example, network device B may be involved in a plurality of MKA sessions with different network devices. Network device B may store the MKA state and the information associated with the MKA session for each of the plurality of MKA sessions. Network device B may distinguish between each of the plurality of MKA sessions based on the identifier associated with each MKA session. In some implementations, network device B may replace and/or delete any previously stored information associated with a different MKA state and/or information associated with a different MKA session in the data structure when network device B stores the information associated with the MKA state and the information associated with the MKA session (e.g., such that the information stored in the data structure is associated with the most recent MKA session established by network device B).

As further shown in FIG. 1B, and by reference number 110, network device B may determine that network device B is to become temporarily unavailable. For example, network device B may receive an input directing network device B to reboot and/or go offline, detect a loss of power to network device B, determine that network device B is scheduled to reboot and/or go offline, detect a failure condition associated with network device B, and/or the like.

As shown by reference number 112, network device B may send a packet (e.g., the packet may be any packet, such as an MKA packet, a packet associated with network traffic, a packet associated with a last gasp message, and/or the like)

to network device A indicating that network device B is to become temporarily unavailable. The packet may indicate that network device A and network device B have previously negotiated (e.g., enabled and/or configured) continuing the MKA session when network device B becomes available again. In some implementations, network device B may send a dying gasp message (e.g., a message indicating that network device B has lost power, is about to reboot, is about to go offline, has experienced a particular failure condition, and/or the like) to network device A when network device B determines that network device B is to become temporarily unavailable.

Figure 1C:
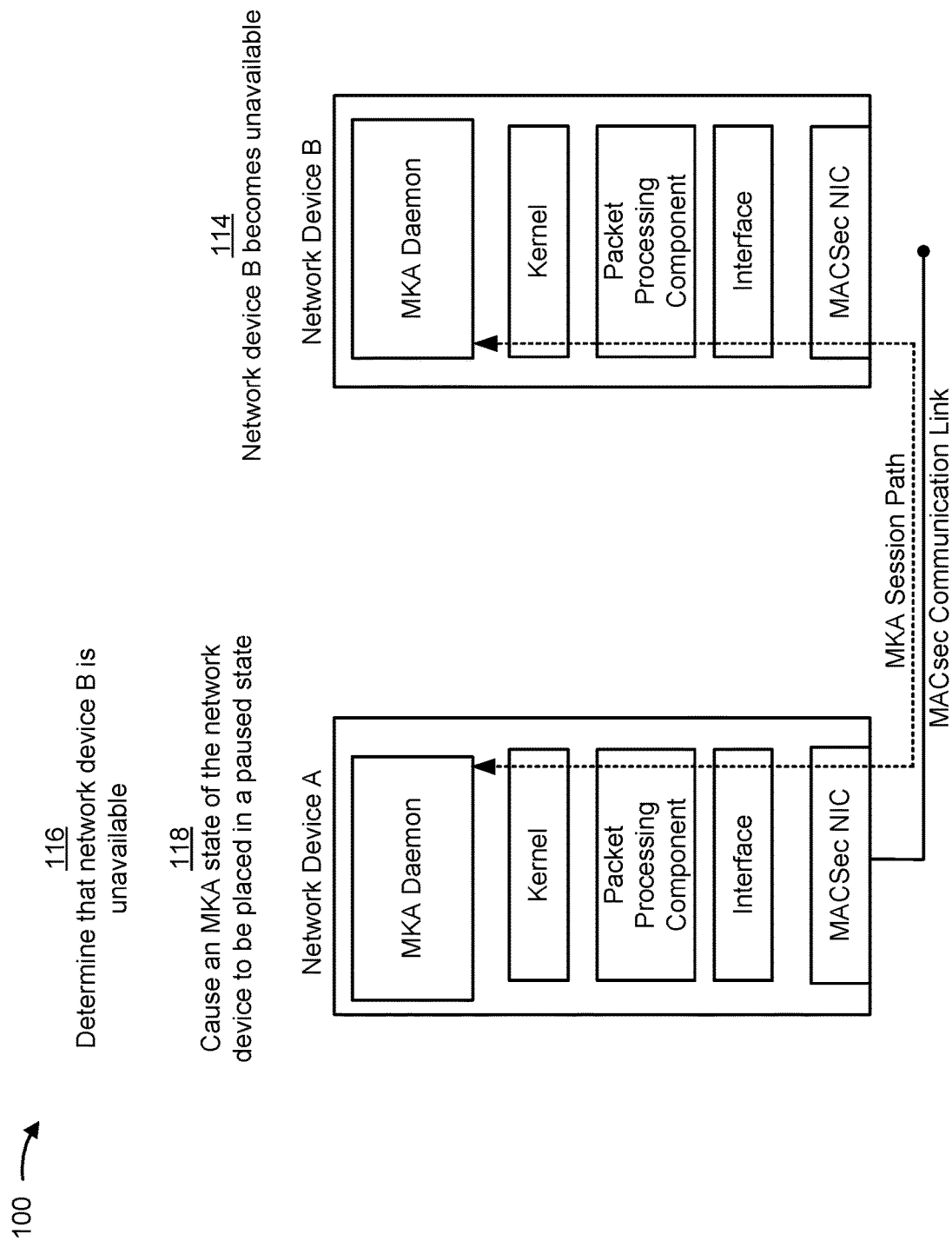

As shown in FIG. 1C, and by reference number 114, network device B may become unavailable. Network device B may become unavailable by rebooting network device B, by going offline, by losing power and restarting, and/or the like. Network device B becoming unavailable may cause the MACsec communication link between network device A and network device B to be broken.

As shown by reference number 116, network device A may determine that network device B is unavailable (e.g., is rebooting, is offline, has failed, and/or the like). Network device A may determine that network device B is unavailable based on the packet received from network device B, based on the dying gasp message received from network device B, based on the MACsec communication link between network device A and network device B being broken, based on not receiving an MKA packet from network device B for a length of time, and/or the like.

As further shown in FIG. 1C, and by reference number 118, network device A may cause an MKA state of network device A to be placed in a paused state. As such, the MKA protocol of the MKA session may be paused between network device A and network device B. For example, one or both of network device A or network device B may pause MKA daemons or processes of the MKA session (e.g., by pausing one or more state machines associated with the MKA daemons). In the paused state, the MKA daemon of network device A (and/or of network device B) may not send MKA packet data associated with the MKA session. Network device A may pause a timeout timer associated with the MKA session. Additionally, or alternatively, network device A (and/or network device B) may suspend or pause a timeout timer associated with sending liveness messages for the MKA session to network device B. Accordingly, because the MKA packet data (which serve as liveness messages) of the MKA session are not to be transmitted and/or monitored for receipt, while the MKA session is in the paused state, the MKA session will not be destroyed.

Network device A, based on determining that network device B is unavailable and that the MKA state of network device A has been placed in a paused state, may store information associated with the MKA state of network device A and/or information associated with the MKA session. The information associated with the MKA state of network device A and/or information associated with the MKA session may be similar to (or the same as) the information stored by network device B, as described above. Network device A may store the information associated with the MKA state of network device A and/or the information associated with the MKA session in a data structure in a similar (or the same) manner as described above with respect to network device B.

Network device A, based on the MKA state of network device A being placed in a paused state, may initiate a resume timer associated with the paused state. The resume timer may relate to an amount of time that the MKA state of network device A may remain in the paused state. For example, if the resume timer expires (e.g., if the amount of time associated with the resume time passes), network device A may destroy the MKA session between network device A and network device B to end, such as by deleting the information associated with the MKA state of network device A and/or the information associated with the MKA session stored by network device A.

The amount of time associated with the resume timer may be preconfigured by network device A. Additionally, or alternatively, the amount of time associated with the resume timer may be configured when network device A and network device B negotiate (e.g., enable and/or configure) the continuation of the MKA session upon network device A and/or network device B becoming available again, as described above. The amount of time associated with the resume timer may be related to the amount of time network device A and/or network device B need to become available after becoming unavailable, such as an amount of time to reboot, an amount of time to recover from a failure condition, an amount of time to address an offline condition, and/or the like. In some implementations, the amount of time associated with the resume timer may be set (e.g., configured) by a user associated with network device A and/or associated with network device B. In some implementations, the amount of time associated with the resume timer may be negotiated between network device 1 and network device 2 using a network protocol (e.g., an MKA protocol and/or the like).

Figure 1D:
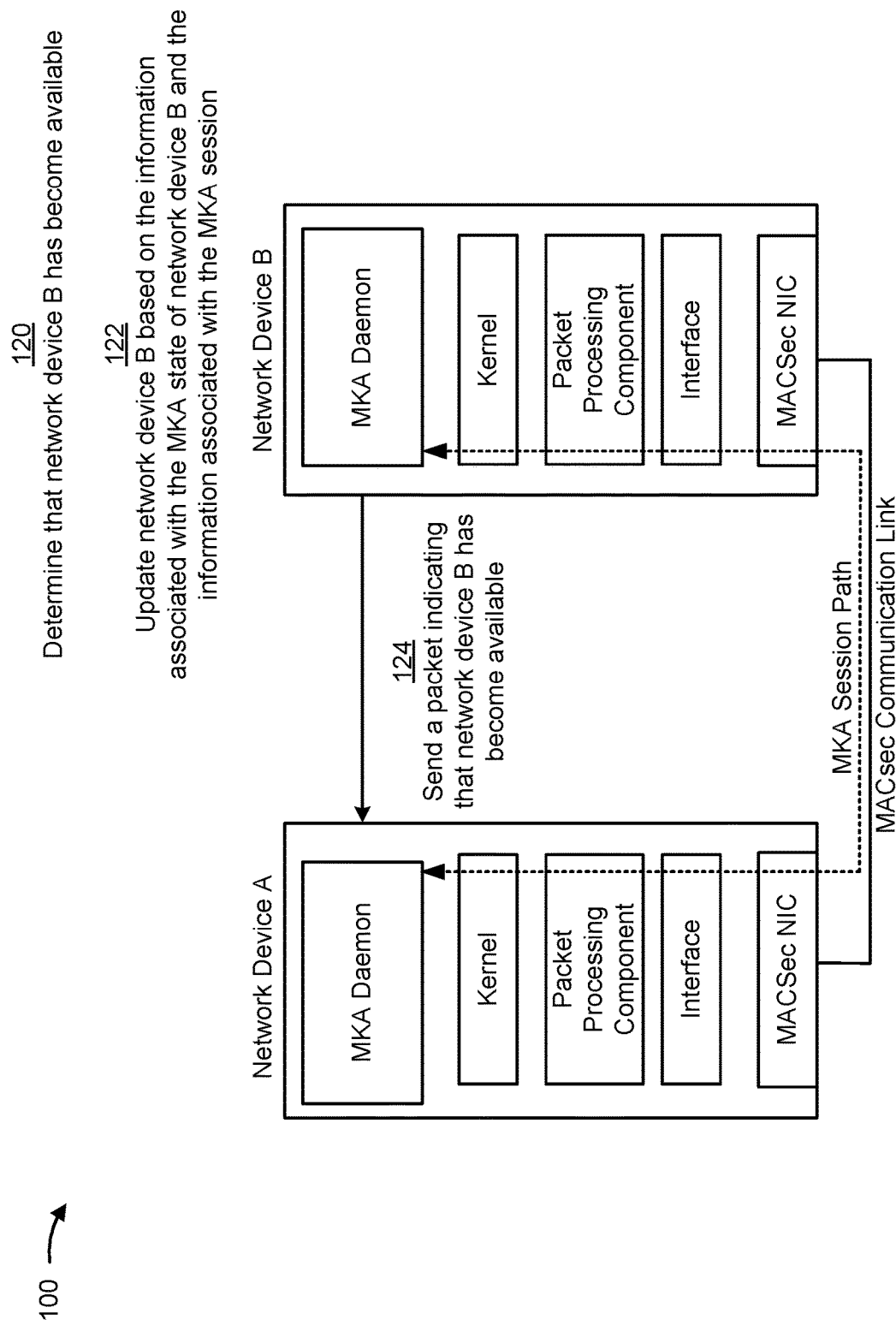

As shown in FIG. 1D, and by reference number 120, network device B may determine that network device B has become available again (e.g., by completing a reboot process, by coming online, by recovering from a failure condition, and/or the like). Network device B may determine that network device B has become available based on network device B completing a reboot process, coming online, recovering from a failure condition, and/or the like.

As shown by reference number 122, network device B, based on determining that network device B has become available, may update network device B based on the information associated with the MKA state and the information associated with the MKA session stored by network device B. For example, network device B may access the data structure to obtain the information associated with the MKA state and the information associated with the MKA session. Network device B may restore the MKA state of network device B based on the information associated with the MKA state and the information associated with the MKA session stored by network device B. Network device B may restore the MKA state of network device B by obtaining the information associated with the MKA state and the information associated with the MKA session stored by network device B and storing the information within network device B for operation (e.g., in the MKA Daemon, in the packet procession component, and/or the like). Network device B may restore one or more MKA keys associated with the MKA session. As such, network device B may return to the same MKA state as was present before network device B became unavailable.

As further shown in FIG. 1D, and by reference number 124, network device B, based on updating network device B and resuming the MKA state, may send a packet (e.g., the packet may be any packet, such as an MKA packet, a packet associated with network traffic, and/or the like) to network device A indicating that network device B has become available. The packet may identify information associated with the MKA state of network device B and/or information associated with the MKA session. For example, the packet may be associated with a message identifier related to the last message identifier stored by network device B (e.g., network device B may associate the packet with a message identifier that is next in a sequence based on the last message identifier stored by network device B). The packet indicating that network device B has become available may identify one or more MKA keys associated with the MKA session.

Figure 1E:
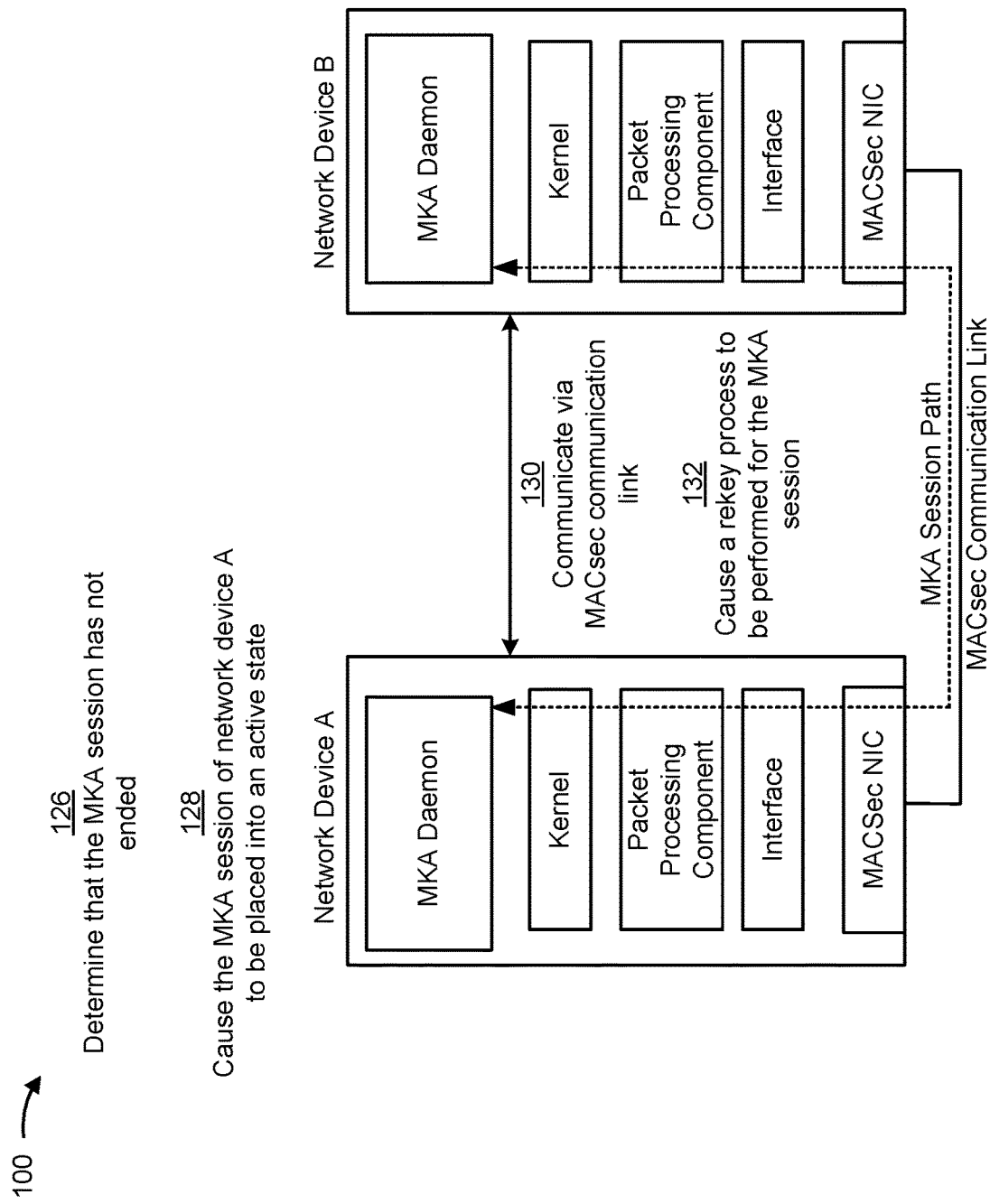

As shown in FIG. 1E, and by reference number 126, network device A, based on receiving the packet indicating that network device B has become available, may determine that the MKA session has not ended. Network device A may determine that the MKA session has not ended based on the resume timer. For example, network device A may determine an amount of time between causing the MKA state of network device A to be placed in a paused state and receiving the packet from network device B indicating that network device B has become available. Network device A may determine if the amount of time between causing the MKA state of network device A to be placed in a paused state and receiving the packet from network device B indicating that network device B has become available satisfies a threshold amount of time. The threshold amount of time may be related to the amount of time associated with the resume timer. In some implementations, network device A may determine that the amount of time associated with the resume timer has expired (e.g., the resume timer may be a countdown timer or a count up timer such that when the resume timer reaches (e.g., by counting down from the amount of time or counting up to the amount of time) the amount of time associated with the resume timer, the resume timer indicates that the MKA session has expired).

Network device A may determine that the MKA session has not ended based on network device A obtaining the information associated with the MKA state of network device A and/or the information associated with the MKA session stored by network device A. For example, if the amount of time associated with the resume timer passes, network device A may delete the information associated with the MKA state of network device A and/or the information associated with the MKA session stored by network device A. As such, if network device A is able to obtain the information associated with the MKA state of network device A and/or the information associated with the MKA session then network device A may determine that the MKA session has not ended.

Network device A may determine that the MKA session has not ended based on identifying the message identifier associated with the packet that indicates network device B has become available. Network device A may identify the message identifier and determine that the message identifier corresponds to a message identifier of the MKA session at the time when the MKA state of network device A was placed in the paused state. Additionally, or alternatively, network device A may identify one or more MKA keys identified in the packet that indicates network device B has become available. Network device A may compare the one or more MKA keys to the MKA keys stored by network device A at the time when the MKA state of network device A was placed in the paused state. If the one or more MKA keys match the MKA keys stored by network device A, then network device A may determine that the MKA session has not ended.

As further shown in FIG. 1E, and by reference number 128, network device A may cause, based on determining that the MKA session has not ended, the MKA session of network device A to be placed into an active state. Network device A may cause, based on the MKA session of network device A being placed into the active state, the MKA protocol associated with the MKA session to resume. Network device A may continue the MKA session when network device B becomes available by reactivating the MKA state associated with network device A. For example, network device A may resume sending MKA packet data (e.g., peer liveness messages) periodically (e.g., every 2 seconds or more) between the MKA daemon of network device A and the MKA daemon of network device B via the MKA session path (e.g., according to a standard).

As shown by reference number 130, network device A and/or network device B may, based on the MKA session of network device A being placed into the active state, communicate traffic via the MACsec communication link. Network device A and network device B may communicate traffic in a similar manner as described above with respect to the communication of traffic before network device B became unavailable.

As further shown in FIG. 1E, and by reference number 132, network device A and/or network device B may cause a rekey process to be performed for the MKA session after the MKA session is placed in the active state. The rekey process may be requested by network device A and/or network device B. Network device A and/or network device B may identify the rekey request in a rekey request MKA packed received from the other network device.

The rekey process may cause the MKA keys associated with the MKA session to be changed, replaced, updated, altered, and/or the like. The rekey process may provide improved security as the MKA keys may have been stored for a period of time by network device A and/or network device B during the time network device B was unavailable. As such, the MKA keys may have been accessed or compromised during the time network device B was unavailable. As such, the rekey process provides the additional security of providing one or more new MKA keys. Alternatively, network device A and/or network device B may not cause the rekey process to be performed. In this situation, the MKA session may continue with the same MKA keys that were used prior to the MKA session being placed in a paused state.

Figure 1F:
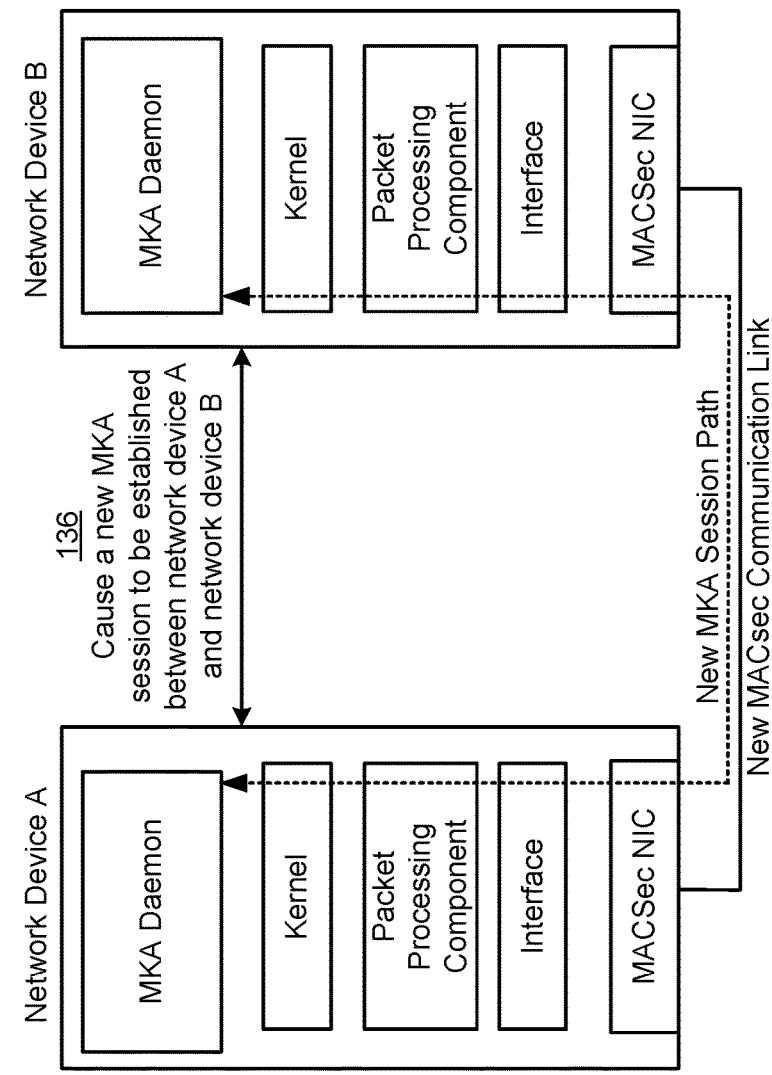

As shown in FIG. 1F, and by reference number 134, network device A may determine, based on receiving the packet that indicates network device B has become available, that the MKA session has ended. For example, network device A may determine that the MKA session has ended based on determining that the amount of time between causing the MKA state of network device A to be placed in a paused state and receiving the packet from network device B indicating that network device B has become available does not satisfy a threshold amount of time (e.g., related to the amount of time associated with the resume timer), determining that the resume timer has expired, determining that network device A is unable to access the information associated with the MKA state of network device A and/or the information associated with the MKA session stored by network device A, determining that the message identifier identified in the packet that indicates network device B has become available does not correspond to the message identifier of the MKA session at the time when the MKA session was placed in the paused state, determining that one or more MKA keys identified in the packet that indicates network device B has become available does not match one or more MKA keys of the MKA session at the time when the MKA session was placed in the paused state, and/or the like.

Network device A may, based on network device A determining that the MKA session has ended, delete any information related to the MKA session stored by network device A. Similarly, network device B may, based on network device B determining that the MKA session has ended (e.g., by network device B independently determining the MKA session has ended (e.g., by not receiving a response to the packet indicating network device B has become available, by determining the MKA session has not been reestablished, and/or the like), by receiving a message from network device A indicating that the MKA session has ended, and/or the like), delete any information related to the MKA session stored by network device B. For example, network device A may delete the information associated with the MKA state of network device A and/or the information associated with the MKA session stored by network device A. Network device B may delete the information associated with the MKA state of network device B and/or the information associated with the MKA session stored by network device B. Deleting the information associated with the MKA state of network device A and/or network device B and/or the information associated with the MKA session may improve security by ensuring that sensitive information (such as the MKA keys) cannot be accessed after the MKA session has ended.

As shown by reference number 136, network device A may, based on network device A determining that the MKA session has ended, cause a new MKA session to be established between network device A and network device B. Similarly, network device B may, based on network device B determining that the MKA session has ended, cause a new MKA session to be established between network device B and network device A. The new MKA session may be established in a similar (or the same) manner as described above with respect to initially establishing the MKA session between network device A and network device B. Network device A and network device B may, based on establishing the new MKA session, communicate traffic via a new MACsec communication link in a similar (or the same) manner as described above.

Some implementations described herein may enable network device A and/or network device B to conserve computing resources and/or network resources that would have otherwise been used to destroy the MKA session when the other network device became unavailable and reestablish the MKA session when the other network device became available again. Furthermore, some implementations described herein may conserve computing resources and/or network resources that would have otherwise been used waiting to communicate traffic while the MKA session is reestablished after the other network device becomes available again.

As indicated above, FIGS. 1A-1F are provided merely as one or more examples. Other examples may differ from what is described with regard to FIGS. 1A-1F. The number and arrangement of devices shown in FIGS. 1A-1F are provided as one or more examples. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
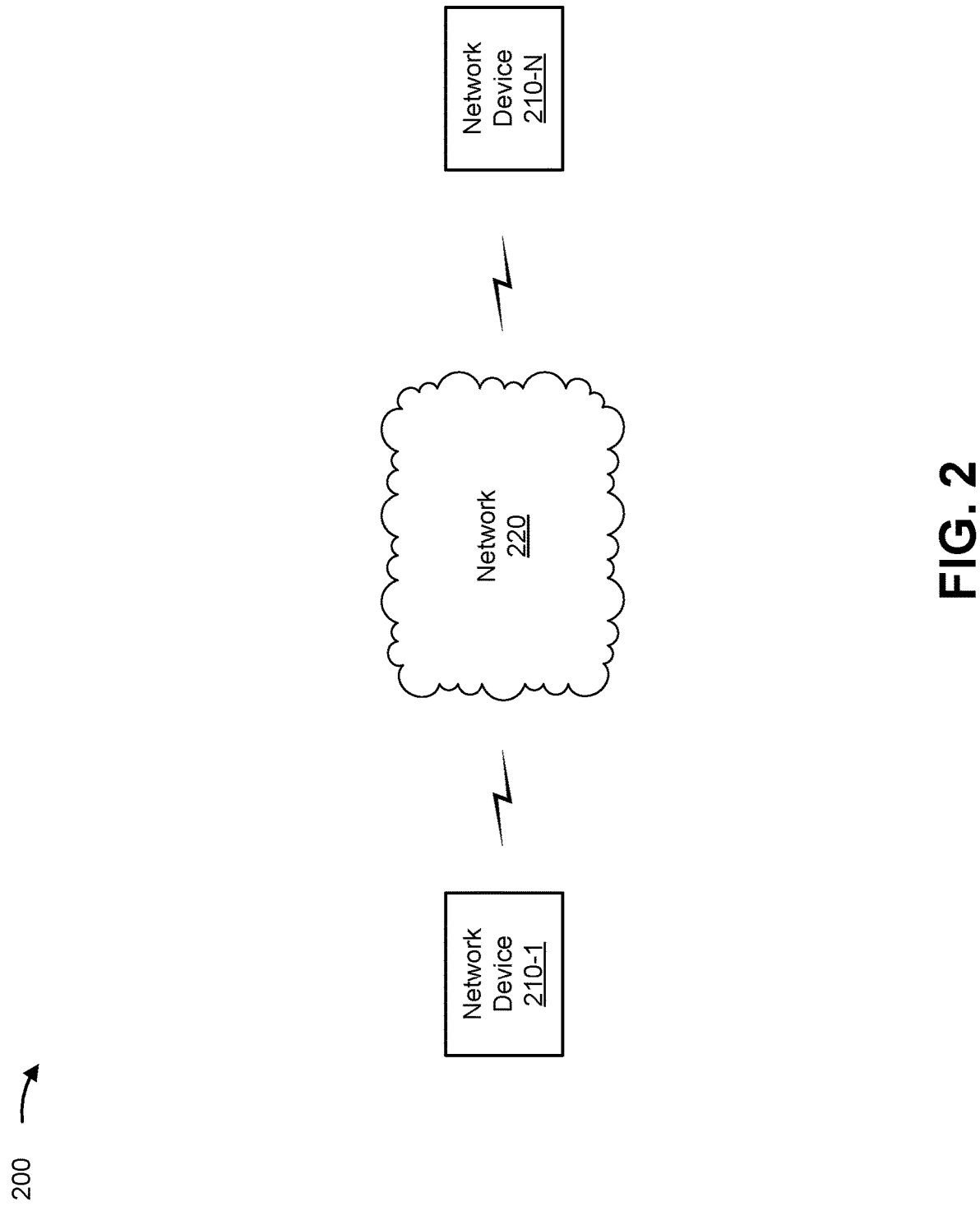
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N), and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet, other information or metadata, and/or the like) in a manner described herein. For example, network device 210 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 210 may include a gateway, a switch, a firewall, a hub, a bridge, a reverse proxy, a server (e.g., a proxy server, a cloud server, a data center server, and/or the like), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
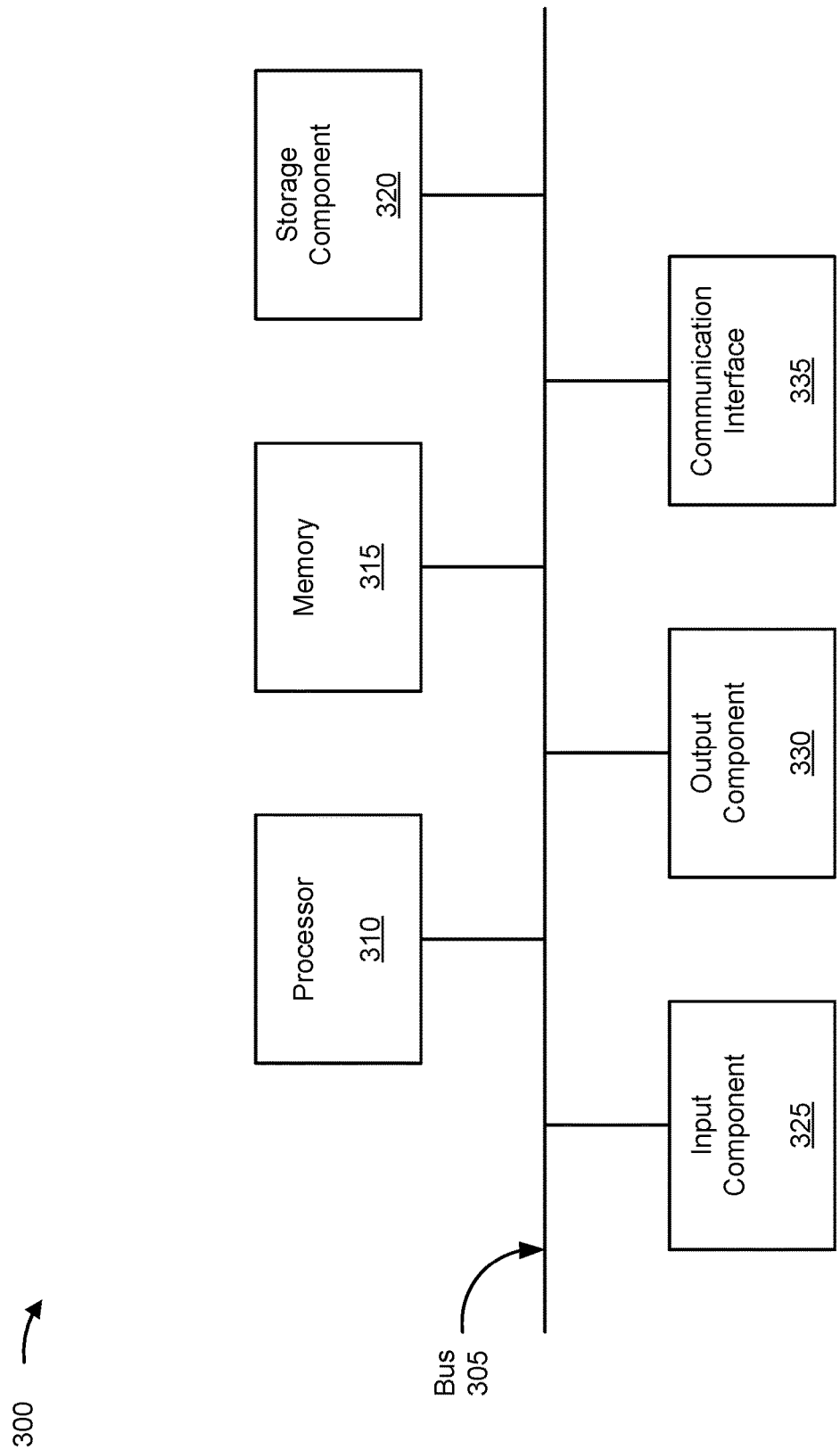
FIGS. 3A and 3B are diagrams of example components of one or more devices of FIG. 2.

FIG. 3A is a diagram of example components of a device 300. Device 300 may correspond to network device 210. In some implementations, network device 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among multiple components of device 300. Processor 310 is implemented in hardware, firmware, and/or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a component for determining location (e.g., a global positioning system (GPS) component) and/or a sensor (e.g., an accelerometer, a gyroscope, an actuator, another type of positional or environmental sensor, and/or the like). Output component 330 includes a component that provides output information from device 300 (via, e.g., a display, a speaker, a haptic feedback component, an audio or visual indicator, and/or the like).

Communication interface 335 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 310 executing software instructions stored by a non-transitory computer-readable medium, such as memory 315 and/or storage component 320. As used herein, the term "computer-readable medium" refers to a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
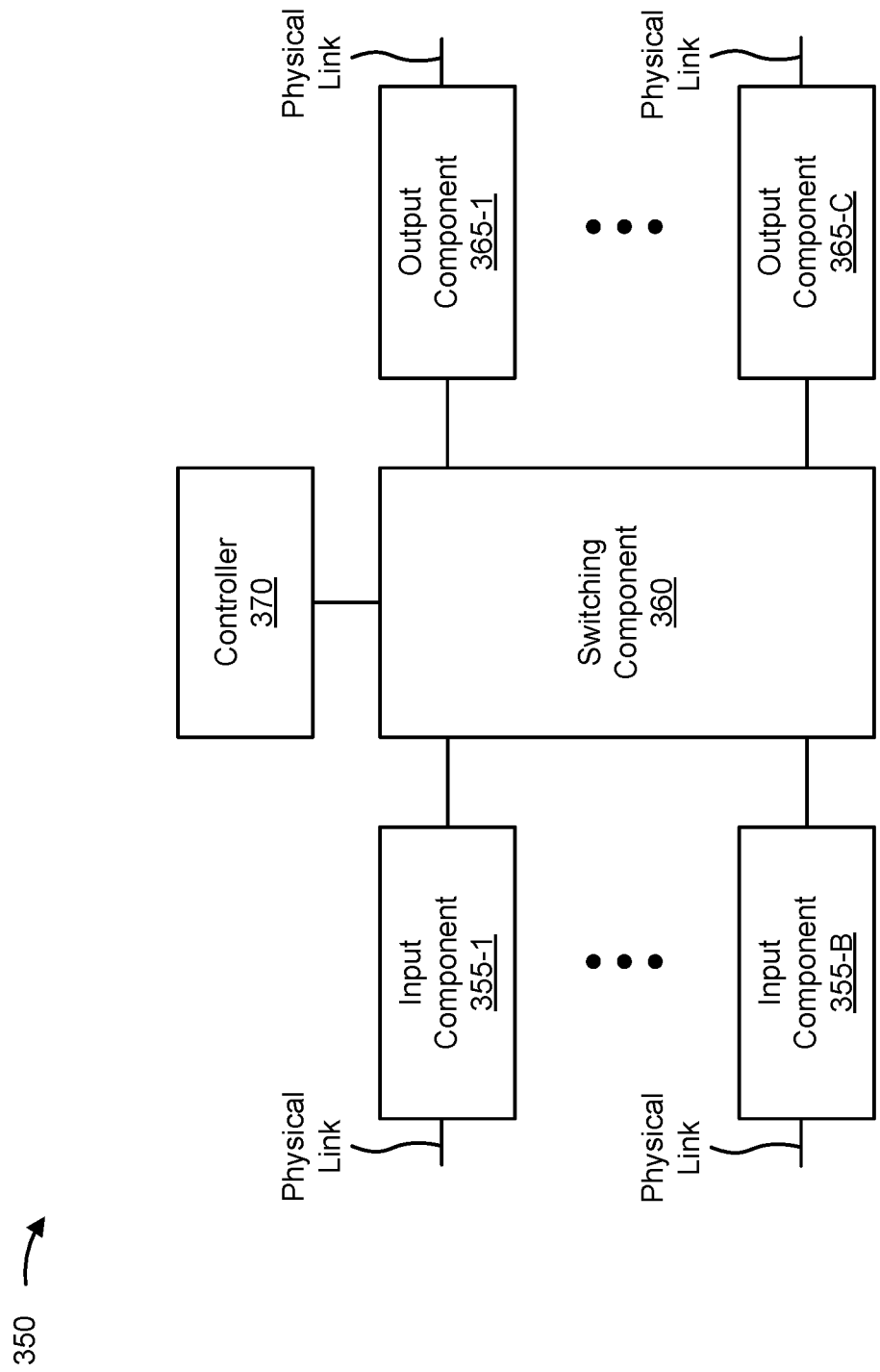

FIG. 3B is a diagram of example components of a device 350. Device 350 may correspond to network device 210, and/or the like. In some implementations, network device 210, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be one or more points of attachment for physical links and may be one or more points of entry for incoming traffic, such as packets. Input component 355 may process incoming traffic, such as by performing data link layer encapsulation or decapsulation. In some implementations, input component 355 may transmit and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate with one another.

Output component 365 may store packets and may schedule packets for transmission on output physical links. Output component 365 may support data link layer encapsulation or decapsulation, and/or a variety of higher-level protocols. In some implementations, output component 365 may transmit packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 350 to exchange information regarding network topology. Controller 370 may create routing tables based on the network topology information, may create forwarding tables based on the routing tables, and may forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
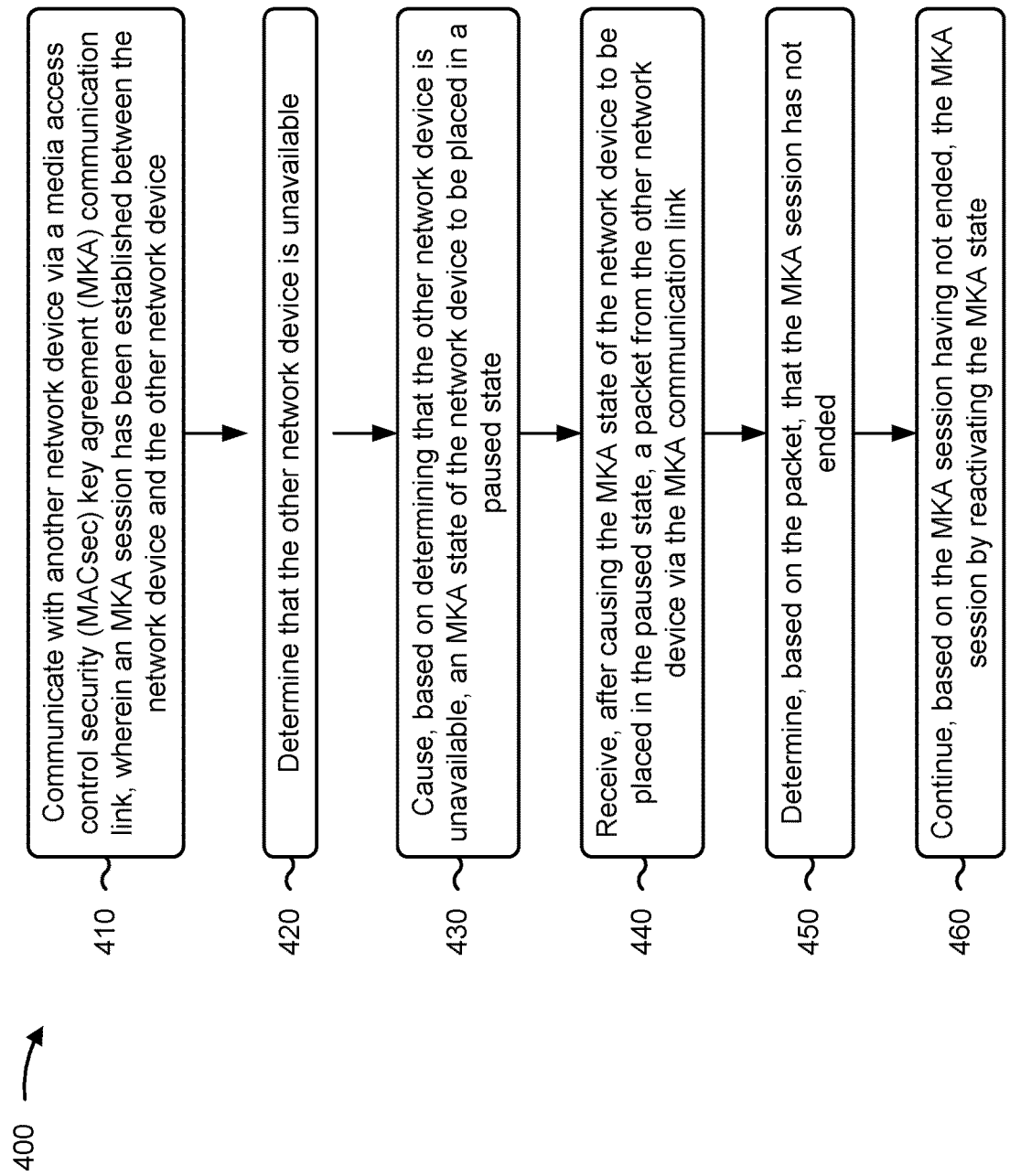

FIG. 4 is a flow chart of an example process 400 for continuing a media access control security (MACsec) key agreement (MKA) session upon a network device becoming temporarily unavailable. In some implementations, one or more process blocks of FIG. 4 may be performed by a network device (e.g., network device 210). In some implementations, one or more process blocks of FIG. 4 may be performed by another device or a group of devices separate from or including the network device, such as another network device 210, a device in communication with network 220, and/or the like.

As shown in FIG. 4, process 400 may include communicating with another network device via a media access control security (MACsec) key agreement (MKA) communication link, wherein an MKA session has been established between the network device and the other network device (block 410). For example, the network device (e.g., using processor 310, memory 315, storage component 320, input component 325, output component 330, communication interface 335, input component 355, switching component 360, output component 365, controller 370, and/or the like) may communicate with another network device via a media access control security (MACsec) key agreement (MKA) communication link, as described above. In some implementations, an MKA session has been established between the network device and the other network device.

As further shown in FIG. 4, process 400 may include determining that the other network device is unavailable (block 420). For example, the network device (e.g., using processor 310, memory 315, storage component 320, input component 325, output component 330, communication interface 335, input component 355, switching component 360, output component 365, controller 370, and/or the like) may determine that the other network device is unavailable, as described above.

As further shown in FIG. 4, process 400 may include causing, based on determining that the other network device is unavailable, an MKA state of the network device to be placed in a paused state (block 430). For example, the network device (e.g., using processor 310, memory 315, storage component 320, input component 325, output component 330, communication interface 335, input component 355, switching component 360, output component 365, controller 370, and/or the like) may cause, based on determining that the other network device is unavailable, an MKA state of the network device to be placed in a paused state, as described above.

As further shown in FIG. 4, process 400 may include receiving, after causing the MKA state of the network device to be placed in the paused state, a packet from the other network device via the MKA communication link (block 440). For example, the network device (e.g., using processor 310, memory 315, storage component 320, input component 325, output component 330, communication interface 335, input component 355, switching component 360, output component 365, controller 370, and/or the like) may receive, after causing the MKA state of the network device to be placed in the paused state, a packet from the other network device via the MKA communication link, as described above.

As further shown in FIG. 4, process 400 may include determining, based on the packet, that the MKA session has not ended (block 450). For example, the network device (e.g., using processor 310, memory 315, storage component 320, input component 325, output component 330, communication interface 335, input component 355, switching component 360, output component 365, controller 370, and/or the like) may determine, based on the packet, that the MKA session has not ended, as described above.

As further shown in FIG. 4, process 400 may include continuing, based on the MKA session having not ended, the MKA session by reactivating the MKA state (block 460). For example, the network device (e.g., using processor 310, memory 315, storage component 320, input component 325, output component 330, communication interface 335, input component 355, switching component 360, output component 365, controller 370, and/or the like) may continue, based on the MKA session having not ended, the MKA session by reactivating the MKA state, as described above.

Process 400 may include additional implementations, such as any single implementation or any combination of implementations described below and/or in connection with one or more other processes described elsewhere herein.

In a first implementation, determining that the other network device is unavailable comprises: processing a particular packet received from the other network device to determine that the other network device has become unavailable.

In a second implementation, alone or in combination with the first implementation, determining that the other network device is unavailable comprises: determining that the network device has not received an MKA packet from the other network device for a length of time.

In a third implementation, alone or in combination with one or more of the first and second implementations, causing the MKA state of the network device to be placed in the paused state comprises: causing the network device to suspend transmission of MKA packets associated with the MKA session; causing the network device to suspend a timeout timer associated with the MKA session; causing the network device to store information associated with MKA session in a data structure, and causing the network device to initiate a resume timer associated with the MKA session, wherein the resume timer is configured or negotiated between the network device and the other network device.

In a fourth implementation, alone or in combination with one or more of the first through third implementations, determining that the MKA session has not ended comprises: determining a length of time between causing the MKA state of the network device to be placed in the paused state and receiving the packet from the other network device via the MKA communication link; determining that the length of time does satisfy a threshold; identifying a message identifier of the packet; determining that the message identifier of the packet corresponds to a message identifier of the MKA session at a time when the MKA state was placed in the paused state, and determining, based on determining that the length of time does satisfy the threshold and that the message identifier of the packet corresponds to the message identifier of the MKA session at the time when the MKA session was placed in the paused state, that the MKA session has not ended.

In a fifth implementation, alone or in combination with one or more of the first through fourth implementations, continuing the MKA session comprises: resuming the MKA session without performing a process for establishing a new MKA session.

In a sixth implementation, alone or in combination with one or more of the first through fifth implementations, continuing the MKA session comprises: causing the MKA state of the network device to be placed into an active state.

In a seventh implementation, alone or in combination with one or more of the first through sixth implementations, continuing the MKA session comprises: causing the MKA state of the network device to be placed into an active state, and causing a rekey process to be performed for the MKA session.

In an eighth implementation, alone or in combination with one or more of the first through seventh implementations, process 400 includes configuring the network device to refrain from terminating an MKA session with the other network device when the other network device is unavailable.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
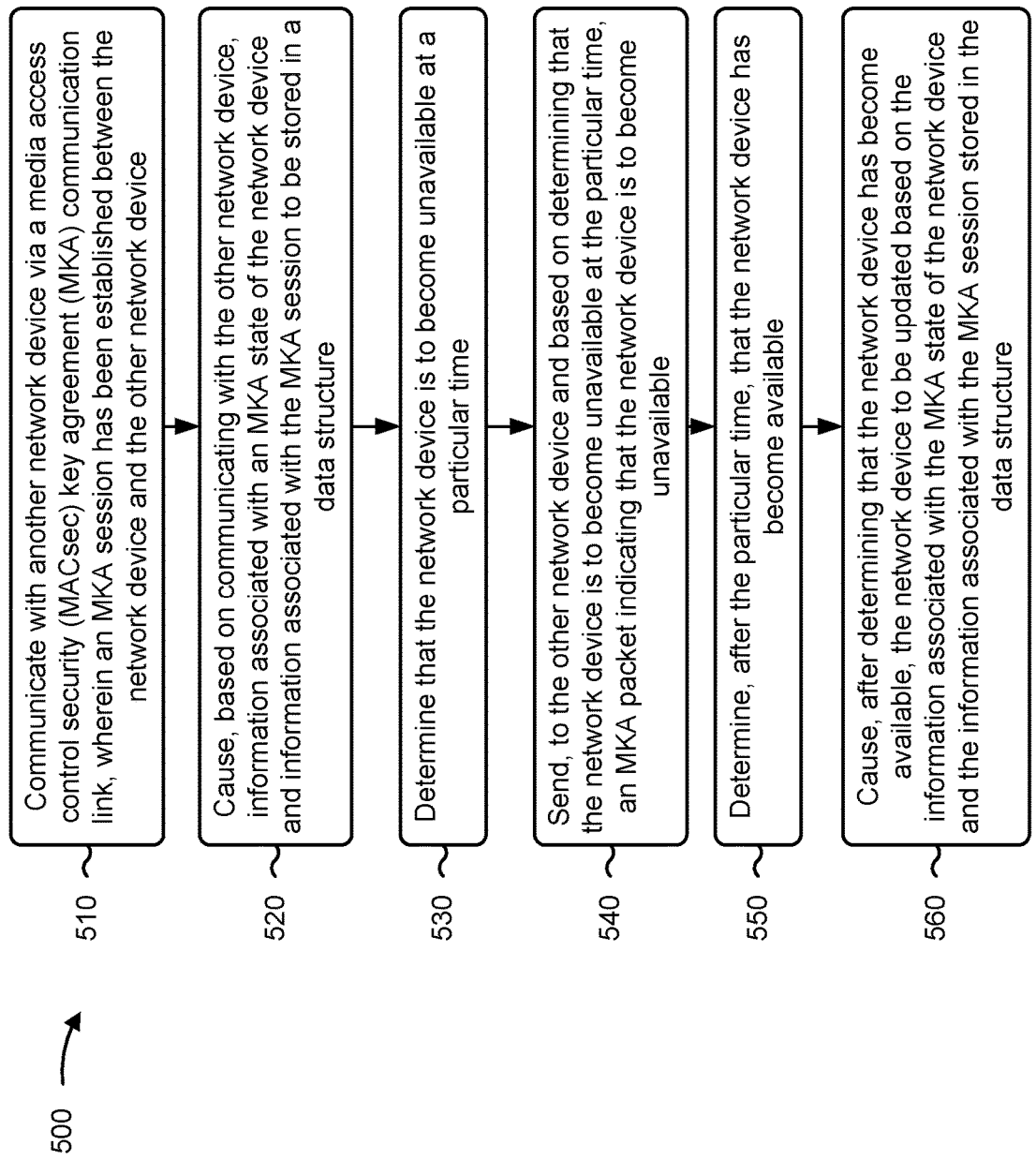

FIG. 5 is a flow chart of an example process 500 for continuing a media access control security (MACsec) key agreement (MKA) session upon a network device becoming temporarily unavailable. In some implementations, one or more process blocks of FIG. 5 may be performed by a network device (e.g., network device 210). In some implementations, one or more process blocks of FIG. 5 may be performed by another device or a group of devices separate from or including the network device, such as another network device 210, a device in communication with network 220, and/or the like.

As shown in FIG. 5, process 500 may include communicating with another network device via a media access control security (MACsec) key agreement (MKA) communication link, wherein an MKA session has been established between the network device and the other network device (block 510). For example, the network device (e.g., using processor 310, memory 315, storage component 320, input component 325, output component 330, communication interface 335, input component 355, switching component 360, output component 365, controller 370, and/or the like) may communicate with another network device via a media access control security (MACsec) key agreement (MKA) communication link, as described above. In some implementations, an MKA session has been established between the network device and the other network device.

As further shown in FIG. 5, process 500 may include causing, based on communicating with the other network device, information associated with an MKA state of the network device and information associated with the MKA session to be stored in a data structure (block 520). For example, the network device (e.g., using processor 310, memory 315, storage component 320, input component 325, output component 330, communication interface 335, input component 355, switching component 360, output component 365, controller 370, and/or the like) may cause, based on communicating with the other network device, information associated with an MKA state of the network device and information associated with the MKA session to be stored in a data structure, as described above.

As further shown in FIG. 5, process 500 may include determining that the network device is to become unavailable at a particular time (block 530). For example, the network device (e.g., using processor 310, memory 315, storage component 320, input component 325, output component 330, communication interface 335, input component 355, switching component 360, output component 365, controller 370, and/or the like) may determine that the network device is to become unavailable at a particular time, as described above.

As further shown in FIG. 5, process 500 may include sending, to the other network device and based on determining that the network device is to become unavailable at the particular time, a packet indicating that the network device is to become unavailable (block 540). For example, the network device (e.g., using processor 310, memory 315, storage component 320, input component 325, output component 330, communication interface 335, input component 355, switching component 360, output component 365, controller 370, and/or the like) may send, to the other network device and based on determining that the network device is to become unavailable at the particular time, a packet indicating that the network device is to become unavailable, as described above.

As further shown in FIG. 5, process 500 may include determining, after the particular time, that the network device has become available (block 550). For example, the network device (e.g., using processor 310, memory 315, storage component 320, input component 325, output component 330, communication interface 335, input component 355, switching component 360, output component 365, controller 370, and/or the like) may determine, after the particular time, that the network device has become available, as described above.

As further shown in FIG. 5, process 500 may include causing, after determining that the network device has become available, the network device to be updated based on the information associated with the MKA state of the network device and the information associated with the MKA session stored in the data structure (block 560). For example, the network device (e.g., using processor 310, memory 315, storage component 320, input component 325, output component 330, communication interface 335, input component 355, switching component 360, output component 365, controller 370, and/or the like) may cause, after determining that the network device has become available, the network device to be updated based on the information associated with the MKA state of the network device and the information associated with the MKA session stored in the data structure, as described above.

Process 500 may include additional implementations, such as any single implementation or any combination of implementations described below and/or in connection with one or more other processes described elsewhere herein.

In a first implementation, sending the MKA packet to the other network device causes the other network device to place an MKA state of the other network device in a paused state.

In a second implementation, alone or in combination with the first implementation, process 500 includes generating, after causing the network device to be updated, an additional MKA packet; and sending the additional MKA packet to the other network device via the MKA communication link.

In a third implementation, alone or in combination with one or more of the first and second implementations, sending the additional MKA packet to the other network device causes the other network device to place an MKA state of the other network device in an active state.

In a fourth implementation, alone or in combination with one or more of the first through third implementations, process 500 includes generating, after causing the network device to be updated, an additional MKA packet; sending the additional MKA packet to the other network device via the MKA communication link; receiving, after sending the additional MKA packet to the other network device, a rekey request MKA packet from the other network device; and causing, based on the rekey request MKA packet, a rekey process to be performed for the MKA session.

In a fifth implementation, alone or in combination with one or more of the first through fourth implementations, process 500 includes generating, after causing the network device to be updated, an additional MKA packet; and sending the additional MKA packet to the other network device via the MKA communication link to cause the other network device to perform a rekey process for the MKA session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for continuing a media access control security (MACsec) key agreement (MKA) session upon a network device becoming temporarily unavailable. In some implementations, one or more process blocks of FIG. 6 may be performed by a network device (e.g., network device 210). In some implementations, one or more process blocks of FIG. 6 may be performed by another device or a group of devices separate from or including the network device, such as another network device 210, a device in communication with network 220, and/or the like.

As shown in FIG. 6, process 600 may include communicating with another network device via a media access control security (MACsec) key agreement (MKA) communication link, wherein an MKA session has been established between the network device and the other network device (block 610). For example, the network device (e.g., using processor 310, memory 315, storage component 320, input component 325, output component 330, communication interface 335, input component 355, switching component 360, output component 365, controller 370, and/or the like) may communicate with another network device via a media access control security (MACsec) key agreement (MKA) communication link, as described above. In some implementations, an MKA session has been established between the network device and the other network device.

As further shown in FIG. 6, process 600 may include causing, based on communicating with the other network device, information associated with an MKA state of the network device and information associated with the MKA session to be stored in a data structure (block 620). For example, the network device (e.g., using processor 310, memory 315, storage component 320, input component 325, output component 330, communication interface 335, input component 355, switching component 360, output component 365, controller 370, and/or the like) may cause, based on communicating with the other network device, information associated with an MKA state of the network device and information associated with the MKA session to be stored in a data structure, as described above.

As further shown in FIG. 6, process 600 may include determining, after causing the information associated with the MKA state of the network device and information associated with the MKA session to be stored in the data structure, that the network device has become available after being temporarily unavailable (block 630). For example, the network device (e.g., using processor 310, memory 315, storage component 320, input component 325, output component 330, communication interface 335, input component 355, switching component 360, output component 365, controller 370, and/or the like) may determine, after causing the information associated with the MKA state of the network device and information associated with the MKA session to be stored in the data structure, that the network device has become available after being temporarily unavailable, as described above.

As further shown in FIG. 6, process 600 may include causing, after determining that the network device has become available, the network device to be updated based on the information associated with the MKA state of the network device and the information associated with the MKA session stored in the data structure (block 640). For example, the network device (e.g., using processor 310, memory 315, storage component 320, input component 325, output component 330, communication interface 335, input component 355, switching component 360, output component 365, controller 370, and/or the like) may cause, after determining that the network device has become available, the network device to be updated based on the information associated with the MKA state of the network device and the information associated with the MKA session stored in the data structure, as described above.

As further shown in FIG. 6, process 600 may include sending, after causing the network device to be updated, an MKA packet to the other network device via the MKA communication link (block 650). For example, the network device (e.g., using processor 310, memory 315, storage component 320, input component 325, output component 330, communication interface 335, input component 355, switching component 360, output component 365, controller 370, and/or the like) may send, after causing the network device to be updated, an MKA packet to the other network device via the MKA communication link, as described above.

As further shown in FIG. 6, process 600 may include determining, based on sending the MKA packet to the other network device via the MKA communication link, that the MKA session has not ended (block 660). For example, the network device (e.g., using processor 310, memory 315, storage component 320, input component 325, output component 330, communication interface 335, input component 355, switching component 360, output component 365, controller 370, and/or the like) may determine, based on sending the MKA packet to the other network device via the MKA communication link, that the MKA session has not ended, as described above.

As further shown in FIG. 6, process 600 may include performing, based on determining that the MKA session has not ended, at least one action (block 670). For example, the network device (e.g., using processor 310, memory 315, storage component 320, input component 325, output component 330, communication interface 335, input component 355, switching component 360, output component 365, controller 370, and/or the like) may perform, based on determining that the MKA session has not ended, at least one action, as described above.

Process 600 may include additional implementations, such as any single implementation or any combination of implementations described below and/or in connection with one or more other processes described elsewhere herein.

In a first implementation, a message identifier of the MKA packet corresponds to a message identifier of the MKA session at a time when the network device became temporarily unavailable.

In a second implementation, alone or in combination with the first implementation, process 600 includes determining whether the network device has received one or more packets associated with the MKA session from the other network device via the MKA communication link.

In a third implementation, alone or in combination with one or more of the first and second implementations, the network device determined that the MKA session has not ended, performing the at least one action includes continuing the MKA session by reactivating the MKA state.

In a fourth implementation, alone or in combination with one or more of the first through third implementations, the network device determined that the MKA session has not ended, performing the at least one action includes causing a rekey process to be performed for the MKA session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   causing, by a first network device, a media access control security (MACsec) key agreement (MKA) state of the first network device to be placed in a paused state based on the first network device communicating a first message identifier during a MKA session with a second network device via an MKA communication link, receiving, by the first network device and after causing the MKA state of the first network device to be placed in the paused state, a packet with a second message identifier from the second network device via the MKA communication link,
wherein the second message identifier is based on the first message identifier;

determining, by the first network device and based on the second message identifier in the packet, that an MKA session has not ended; and continuing, by the first network device and based on the MKA session having not ended, the MKA session by reactivating the MKA state.

2. The method of claim 1, wherein determining that the MKA session has not ended comprises:
determining that an identifier of the packet is next in a sequence of identifiers.

3. The method of claim 1, wherein causing the MKA state of the first network device to be placed in the paused state comprises:
causing the MKA state of the first network device to be placed in the paused state based on determining that the second network device is unavailable.

4. The method of claim 1, further comprising:
causing information associated with the MKA state of the first network device and information associated with the MKA session to be stored in a data structure.

5. The method of claim 1, further comprising:
receiving, after sending an additional MKA packet to the second network device, a rekey request MKA packet from the second network device; and
causing, based on the rekey request MKA packet, a rekey process to be performed for the MKA session.

6. The method of claim 1, wherein determining that the MKA session has not ended comprises:
determining that the MKA session has not ended based on identifying one or more MKA keys identified in the packet.

7. The method of claim 1, further comprising:
determining that the second network device is unavailable.

8. A first network device, comprising:
one or more memories; and
one or more processors to:
communicate a first message identifier of a media access control security (MACsec) key agreement (MKA) session with a second network device via an MKA communication link,
cause a state of the first network device to be paused;
receive a packet from the second network device via the MKA communication link;
determine, based on a second message identifier in the packet, that the MKA session has not ended; and
perform, based on determining that the MKA session has not ended, at least one action.

9. The first network device of claim 8, wherein the one or more processors, to determine that the MKA session has not ended, are to:
determine that the MKA session has not ended based on identifying one or more MKA keys identified in the packet.

10. The first network device of claim 8, wherein the one or more processors are further to:
determine that the second network device is unavailable.

11. The first network device of claim 8, wherein the one or more processors, to perform the at least one action, are to:
continue, based on the MKA session having not ended, the MKA session by reactivating an MKA state.

12. The first network device of claim 8, wherein the one or more processors are further to:
cause information associated with an MKA state of the first network device and information associated with the MKA session to be stored in a data structure.

13. The first network device of claim 8, wherein the one or more processors, to perform the at least one action, are to:
determine whether the first network device has received one or more packets associated with the MKA session from the second network device via the MKA communication link.

14. The first network device of claim 8, wherein the one or more processors, to perform the at least one action, are to:
cause a rekey process to be performed for the MKA session.

15. A non-transitory computer-readable medium storing instructions, the instructions comprising:
one or more instructions that, when executed by one or more processors of a first network device, cause the first network device to:
communicate with a second network device via a media access control security (MACsec) key agreement (MKA) communication link;
send, to the second network device and based on determining that the first network device is to become unavailable, a first MKA packet indicating that the first network device is to become unavailable; and
send a second MKA packet when the first network device becomes available,
wherein a second message identifier of the second MKA packet is based on a first message identifier of the first MKA packet.

16. The non-transitory computer-readable medium of claim 15, wherein the one or more instructions further cause the one or more processors to:
determine that the second network device is unavailable.

17. The non-transitory computer-readable medium of claim 15, wherein the one or more instructions further cause the one or more processors to:
determine that an identifier of the second MKA packet is next in a sequence of identifiers.

18. The non-transitory computer-readable medium of claim 15, wherein the one or more instructions further cause the one or more processors to:
cause information associated with an MKA state of the first network device to be stored in a data structure.

19. The non-transitory computer-readable medium of claim 15, wherein the one or more instructions further cause the one or more processors to:
receive, after sending an additional MKA packet to the second network device, a rekey request MKA packet from the second network device; and
cause, based on the rekey request MKA packet, a rekey process to be performed.

20. The non-transitory computer-readable medium of claim 15, wherein the one or more instructions further cause the one or more processors to:
cause an MKA state of the first network device to be placed in a paused state based on processing a particular packet received from the second network device.

* * * * *